(12) United States Patent
Dai et al.

(10) Patent No.: US 9,907,061 B2
(45) Date of Patent: Feb. 27, 2018

(54) EPDCCH TRANSMITTING AND RECEIVING METHOD, BASE STATION AND USER EQUIPMENT

(71) Applicant: ZTE CORPORATION, Shenzhen, Guangdong Province (CN)

(72) Inventors: Bo Dai, Shenzhen (CN); Yijian Chen, Shenzhen (CN); Zhisong Zuo, Shenzhen (CN)

(73) Assignee: ZTE CORPORATION (CN)

( * ) Notice: Subject to any disclaimer, the term of this patent is extended or adjusted under 35 U.S.C. 154(b) by 125 days.

(21) Appl. No.: 14/439,930

(22) PCT Filed: Aug. 30, 2013

(86) PCT No.: PCT/CN2013/082693
§ 371 (c)(1),
(2) Date: Apr. 30, 2015

(87) PCT Pub. No.: WO2014/067340
PCT Pub. Date: May 8, 2014

(65) Prior Publication Data
US 2015/0296489 A1  Oct. 15, 2015

(30) Foreign Application Priority Data

Nov. 2, 2012  (CN) .......................... 2012 1 0433823

(51) Int. Cl.
*H04W 72/04* (2009.01)
*H04L 5/00* (2006.01)

(52) U.S. Cl.
CPC ......... *H04W 72/042* (2013.01); *H04L 5/0041* (2013.01); *H04L 5/0053* (2013.01); *H04L 5/0023* (2013.01)

(58) Field of Classification Search
CPC ... H04L 5/0053; H04L 5/0041; H04L 5/0023; H04W 72/042
See application file for complete search history.

(56) References Cited

U.S. PATENT DOCUMENTS

2011/0256836 A1  10/2011  Miki et al.
2013/0215842 A1*  8/2013  Han ..................... H04W 72/042
                                              370/329

(Continued)

FOREIGN PATENT DOCUMENTS

CN    102368759 A    3/2012
CN    102484871 A    5/2012

(Continued)

OTHER PUBLICATIONS

3GPP TSG RAN WG1 Meeting #70bis, R1-124199 "Remaining details of eCCE to eREG mapping," Oct. 12, 2012, 3GPP.*

(Continued)

*Primary Examiner* — Jae Y Lee
(74) *Attorney, Agent, or Firm* — Plumsea Law Group, LLC (57) ABSTRACT

The embodiments of the present document relate to an enhanced Physical Downlink Control Channel (ePDCCH) transmitting and receiving method and device, base station and user equipment. The method includes: a base station determining a candidate enhanced Control Channel Element (eCCE) index for transmitting an ePDCCH in an ePDCCH resource set; the base station determining an enhanced Resource Element Group (eREG) index mapped by the candidate eCCE index for transmitting the ePDCCH; and the base station sending the ePDCCH to a terminal according to a determined result, wherein, an eCCE is a discretely mapped eCCE (D-eCCE).

15 Claims, 3 Drawing Sheets

(56) References Cited

U.S. PATENT DOCUMENTS

| | | | |
|---|---|---|---|
| 2015/0003349 A1* | 1/2015 | Kim | H04W 72/042 370/329 |
| 2015/0257131 A1* | 9/2015 | Wong | H04L 5/001 370/329 |

FOREIGN PATENT DOCUMENTS

| CN | 102711253 A | 10/2012 |
|---|---|---|
| CN | 102740473 A | 10/2012 |
| CN | 102754357 A | 10/2012 |

OTHER PUBLICATIONS

Written Opinion of the International Search Authority mailed Dec. 5, 2013 for PCT Application No. PCT/CN2013/082693.

Panasonic: "eCCE/eREG to RE mapping for EPDCCH," 3GPP TSG RAN WG1 Meeting #70bis, San Diego, USA Oct. 8-12, 2012. R1-124238.

LG Electronics: "Remaining details of ECCE and EREG resource mapping," 3GPPS TSG RAN WG1 Meeting #70bis San Diego, USA, Oct. 8-12, 2012. R1-124553.

Motorola Mobility: "Remaining details of eCCE and eREG mapping for EPDCCH," 3GPP TSG RAN WG1 #70bis, Oct. 8-12, 2012, San Diego, USA. R1-124456.

Huawei, HiSilicon: "Mapping of ECCE to EREG for localized and distributed transmission," 3GPP RAN WG1 Meeting #70bis San Diego, USA, Oct. 8-12, 2012. R1-124561.

Alcatel-Lucent, Alcatel-Lucent Shanghai Bell: "Remaining details of ECCE/EREG to mapping for EPDCCH," 3GPP TSG RAN WG1 Meeting #70bis. San Diego, USA, Oct. 8-12, 2012. R1-124417.

European Search Report issued Oct. 15, 2015, in European Application No. EP13850742.1.

Chinese Office Action dated Feb. 24, 2017 for CN Application No. 201210433823.4.

Remaining details of eCCE to eREG mapping, ZTE, 3rd Generation partnership project (3GPP) Draft R1-124199, Mobile Competence Center, San Diego, Sep. 29, 2012, 7pp.

* cited by examiner

EPDCCH TRANSMITTING AND RECEIVING METHOD, BASE STATION AND USER EQUIPMENT

CROSS-REFERENCE TO RELATED APPLICATION(S)

This application is the U.S. National Phase application of PCT application number PCT/CN2013/082693 having a PCT filing date of Aug. 30, 2013, which claims priority of Chinese patent application 201210433823.4 filed on Nov. 2, 2012, the disclosures of which are hereby incorporated by reference.

TECHNICAL FIELD

The present document relates to the field of communication, and particularly, to an enhanced physical downlink control channel (ePDCCH) transmitting and receiving method and device, base station and user equipment.

BACKGROUND

There are two frame structures in the Long Term Evolution (LTE) system, a frame structure Type 1 is applicable to Frequency Division Duplex (FDD) and frequency division half-duplex. The length of each radio frame is 10 ms and composed of 20 slots, each slot is 0.5 ms and numbered from 0 to 19. Wherein, one subframe is composed of two successive slots, for example, a subframe i is composed of two successive slots $2i$ and $2i+1$.

A frame structure Type 2 is applicable to Time Division Duplex (TDD). The length of one radio frame is 10 ms and composed of two half-frames with lengths of 5 ms. One half-frame is composed of five subframes with lengths of 1 ms. A particular subframe is composed of a downlink particular subframe (DwPTS), a Guard Period (GP) and an uplink particular subframe (UpPTS), whose total length is 1 ms. Each subframe is composed of two slots $2i$ and $2i+1$ with lengths of 0.5 ms (15360×Ts).

In the above two frame structures, with regard to a Normal Cyclic Prefix (Normal CP), one slot contains 7 symbols with lengths of 66.7 microsecond (us), wherein a CP length of the first symbol is 5.21 us, and a length of each of the rest 6 symbols is 4.69 us; with regard to an Extended Cyclic Prefix (Extended CP), one slot contains 6 symbols, and a CP length of each symbol is 16.67 us.

Figure 1:
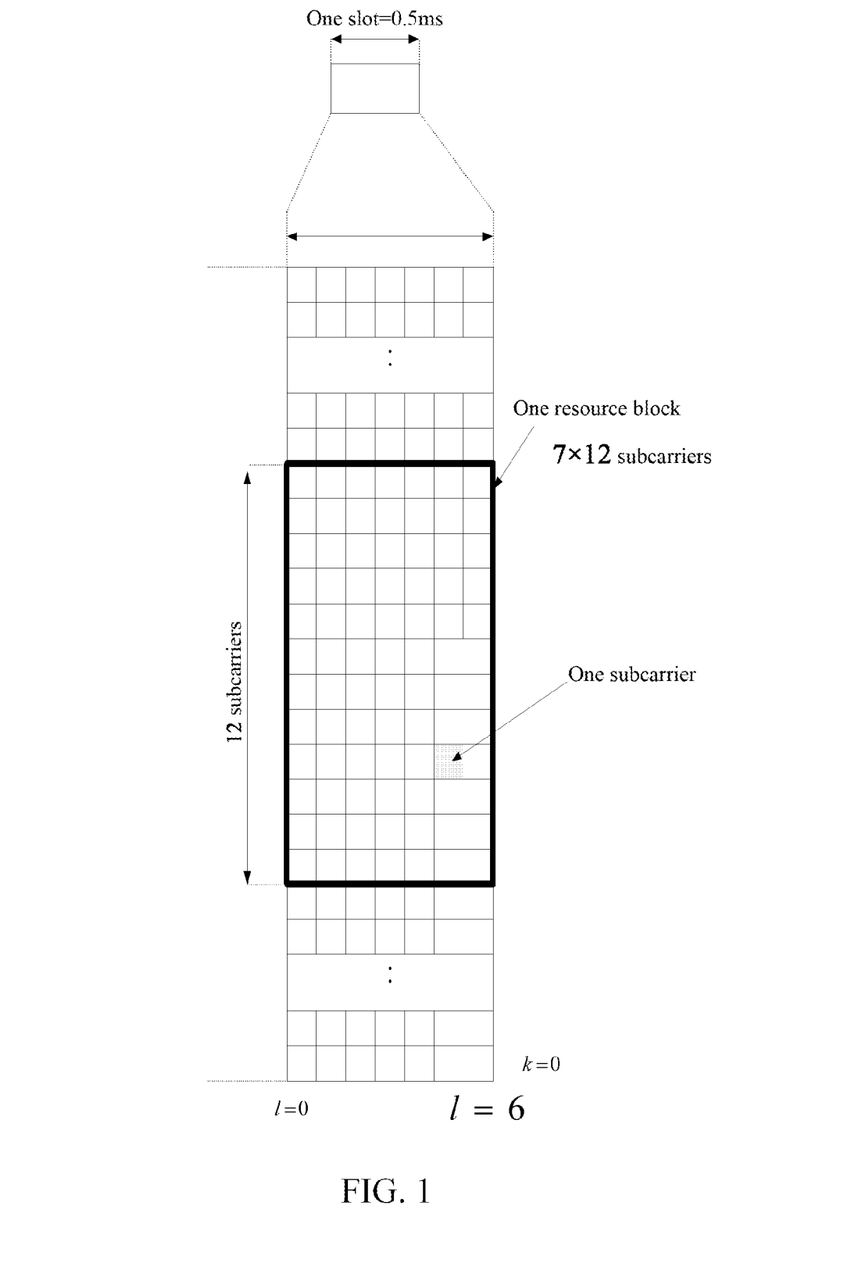
FIG. 1 is a schematic diagram of resource block mapping when a cyclic prefix of the subframe is a normal cyclic prefix according to the related art.

One Resource Element (RE) is an Orthogonal Frequency Division Multiplexing (OFDM) symbol in a time domain and a subcarrier in a frequency domain; one slot contains $N_{symb}^{DL}$ OFDM symbols, one Resource Block (RB) consists of $N_{symb}^{DL} \times N_{sc}^{RB}$ resource elements, and it is one slot in the time domain and 180 kHz in the frequency domain; when the cyclic prefix of the subframe is the normal cyclic prefix, one resource block is as shown in FIG. 1; and it corresponds to a RB-pair in the same frequency domain in one subframe.

The following three kinds of downlink physical control channels are defined in the LTE: a Physical downlink Control Format Indicator Channel (PCFICH), a Physical Hybrid Automatic Retransmission Request Indicator Channel (PHICH) and a Physical Downlink Control Channel (PDCCH). Wherein, information borne on the physical downlink control format indicator channel indicates a size of the time domain of the downlink control area in the subframe.

The physical downlink control channel PDCCH is mapped to physical resources in a unit of Control Channel Element (CCE), a size of one CCE is 9 Resource Element Groups (REG) namely 36 resource elements, one PDCCH has four kinds of Aggregation Levels, the four kinds of aggregation levels respectively correspond to one PDCCH occupying 1, 2, 4 or 8 CCEs, called an aggregation level 1, an aggregation level 2, an aggregation level 4 and an aggregation level 8, corresponding to the four formats of the PDCCH, that is, the aggregation level represents the size of the physical resource occupied by the physical downlink control channel. Moreover, search space of the physical downlink control channel of the user equipment is divided into common search space and user equipment-specific search space, wherein, the number of location candidates corresponding to each aggregation level (1, 2, 4, 8) in the user equipment-specific search space is 6, 6, 2, 2 respectively.

In the kth subframe, a control domain bearing the PDCCH is constituted of a group of $N_{CCE,k}$ CCEs numbered from 0 to $N_{CCE,k}-1$. The UE should detect a group of PDCCH candidates in every non-Discontinuous Reception (non-DRX) subframe to acquire control information, the detection refers to decoding the PDCCHs within the group according to all DCI formats to be detected. The PDCCH candidates required to be detected are defined by means of the search space, and with regard to the aggregation level $L \in \{1, 2, 4, 8\}$, the search space $S_k^{(L)}$ is defined by a group of PDCCH candidates. A CCE corresponding to a PDCCH candidate m in the search space $S_k^{(L)}$ is defined by the following formula:

$$L \cdot \{(Y_k + m) \bmod \lfloor N_{CCE,k}/L \rfloor\} + i,$$

wherein $i=0, \ldots, L-1, m=0, \ldots, M^{(L)}-1$, $M^{(L)}$ is the number of PDCCH candidates to be detected in the search space $S_k^{(L)}$.

With regard to the common search space, $Y_k=0$, L is 4 and 8.

With regard to the UE-specific search space, L is 1, 2, 4 and 8.

$$Y_k = (A \cdot Y_{k-1}) \bmod D,$$

wherein $Y_{-1} = n_{RNTI} \neq 0$, $A=39827$, $D=65537$, $k = \lfloor n_s/2 \rfloor$, $\lfloor \ \rfloor$ represents rounded down, $n_s$ is a slot number in one radio frame. $n_{RNTI}$ is a corresponding Radio Network Temporary Identifier (RNTI).

In the Release (R) 8/9 of the LTE system, in order to measure the quality of the channel and demodulate the received data symbol, a Common Reference Signal (CRS) is designed. The User Equipment (UE) can perform measurement of the channel through the CRS, thereby supporting the UE to perform cell reselection and handover to a target cell. In the LTE R10, in order to improve a cell average spectrum utilization ratio, a cell edge spectrum utilization ratio and a throughput rate of each UE, two kinds of reference signals are respectively defined: a Channel State Information-Reference Signal (CSI-RS) and a Demodulation Reference Signal (DMRS), wherein, the CSI-RS is used for the measurement of the channel, the DMRS is used for the demodulation of the downlink shared channel, through the DMRS demodulation, interference between different receiving sides and different cells can be reduced with the method of beam, and performance reduction caused by the codebook granularity can be decreased, and overhead of the downlink control signaling is also reduced to a certain extent.

In a heterogeneous network, since different base station types have stronger interference, in consideration of an interference problem of a Macro eNodeB to a Pico eNodeB and an interference problem of a Home eNodeB to the Macro eNodeB, the LTE R11 proposes to solve the interference problems with a multi-antenna transmission method based on the user-specific pilot frequency, moreover, by mapping the PDCCH to a PDSCH area, and by means of frequency division multiplexing similar to PDSCH multiplexing, frequency domain coordination of the inter-cell interference can be implemented. Such enhanced PDCCH is called ePDCCH (enhanced PDCCH).

With respect to transmitting and receiving of the ePDCCH, no effective solution has been proposed at present.

SUMMARY

The embodiments of the present document provide an enhanced physical downlink control channel (ePDCCH) transmitting and receiving method and device, base station and user equipment, to provide an effective solution for the ePDCCH.

The embodiment of the present document provides an enhanced physical downlink control channel (ePDCCH) transmitting method, which comprises:

a base station determining a candidate enhanced control channel element (eCCE) index for transmitting an ePDCCH in an ePDCCH resource set;

the base station determining an enhanced resource element group (eREG) index mapped by the candidate eCCE index for transmitting the ePDCCH;

the base station sending the ePDCCH to a terminal according to a determined result; and wherein the eCCE is a discretely mapped eCCE (D-eCCE), and a mapping relationship between the eCCE index and the eREG index comprises at least one of the following:

the ePDCCH resource set comprising k D-eCCE groups divided according to a sequence of D-eCCE indexes, in a same D-eCCE group, each D-eCCE being mapped to a same eREG index group, each eREG index group comprising a plurality of eREG indexes, and when different D-eCCEs of the same D-eCCE group are mapped to a same eREG index, the same eREG index corresponding to the different D-eCCEs being located on different resource blocks.

The embodiment of the present document provides an enhanced physical downlink control channel (ePDCCH) receiving method, which comprises:

a terminal determining an enhanced control channel element (eCCE) index to be detected in an ePDCCH resource set;

the terminal determining an enhanced resource element group (eREG) index mapped by the eCCE index to be detected;

detecting an ePDCCH sent by a base station according to a determined result; and wherein the eCCE is a discretely mapped eCCE (D-eCCE), and a mapping relationship between the eCCE index and the eREG index comprises at least one of the following:

the ePDCCH resource set comprising k D-eCCE groups divided according to a sequence of D-eCCE indexes, in a same D-eCCE group, each D-eCCE being mapped to a same eREG index group, each eREG index group comprising a plurality of eREG indexes, and when different D-eCCEs of the same D-eCCE group are mapped to a same eREG index, the same eREG index corresponding to the different D-eCCEs being located on different resource blocks.

The embodiment of the present document further provides a base station, which comprises:

an eCCE index determination module, configured to determine a candidate enhanced control channel element (eCCE) index for transmitting an ePDCCH in an ePDCCH resource set;

an eREG index determination module, configured to determine an enhanced resource element group (eREG) index mapped by the candidate eCCE index for transmitting the ePDCCH;

a sending module, configured to detect the ePDCCH sent by the base station according to a determined result; and wherein the eCCE is a discretely mapped eCCE (D-eCCE), and a mapping relationship between the eCCE index and the eREG index comprises at least one of the following:

the ePDCCH resource set comprising k D-eCCE groups divided according to a sequence of D-eCCE indexes, in a same D-eCCE group, each D-eCCE being mapped to a same eREG index group, each eREG index group comprising a plurality of eREG indexes, and when different D-eCCEs of the same D-eCCE group are mapped to a same eREG index, the same eREG index corresponding to the different D-eCCEs being located on different resource blocks.

The embodiment of the present document provides a terminal, which comprises:

an eCCE index determination module, configured to determine an enhanced control channel element (eCCE) index to be detected in an ePDCCH resource set;

an eREG index determination module, configured to determine an enhanced resource element group (eREG) index mapped by the eCCE index to be detected;

a receiving module, configured to detect and receive an ePDCCH sent by a base station according to a determined result; and wherein the eCCE is a discretely mapped eCCE (D-eCCE), and a mapping relationship between the eCCE index and the eREG index comprises at least one of the following: the ePDCCH resource set comprising k D-eCCE groups divided according to a sequence of D-eCCE indexes, in a same D-eCCE group, each D-eCCE being mapped to a same eREG index group, each eREG index group comprising a plurality of eREG indexes, and when different D-eCCEs of the same D-eCCE group are mapped to a same eREG index, the same eREG index corresponding to the different D-eCCEs being located on different resource blocks.

The embodiments of the present document provide an ePDCCH transmitting and receiving method and device, base station and user equipment, so that the discretely mapped ePDCCH is mapped to multiple resource blocks; and it tries to adopt a unified mapping method in various scenarios (a scenario of the resource block pair including 4 eCCEs, a scenario of the resource block pair including 2 eCCEs, various values of N and various values of k), thus a stable ePDCCH transmission performance is guaranteed, and a resource utilization rate and scheduling flexibility also can be improved.

BRIEF DESCRIPTION OF THE DRAWINGS

Here, the described accompanying drawings are used to provide an understanding of the embodiments of the present document and constitute a part of the present document. The exemplary embodiments and illustrations thereof of the present document are used to explain the present document, but do not constitute an inappropriate limitation on the present document. In the drawings.

PREFERRED EMBODIMENTS OF THE DOCUMENT

The technical scheme in the embodiments of the present document will be described clearly and completely in combination with the accompanying drawings in the embodiments of the present document below. Apparently, the described embodiments are just a part of embodiments of the present document but not all the embodiments. Based on the embodiments in the present document, all other embodiments obtained by the ordinary skilled in the art in a premise of not contributing creative labor belong to the protection scope of the present document. The embodiments in the present document and the characteristics in the embodiments can be optionally combined with each other in the condition of no conflict.

Figure 2:
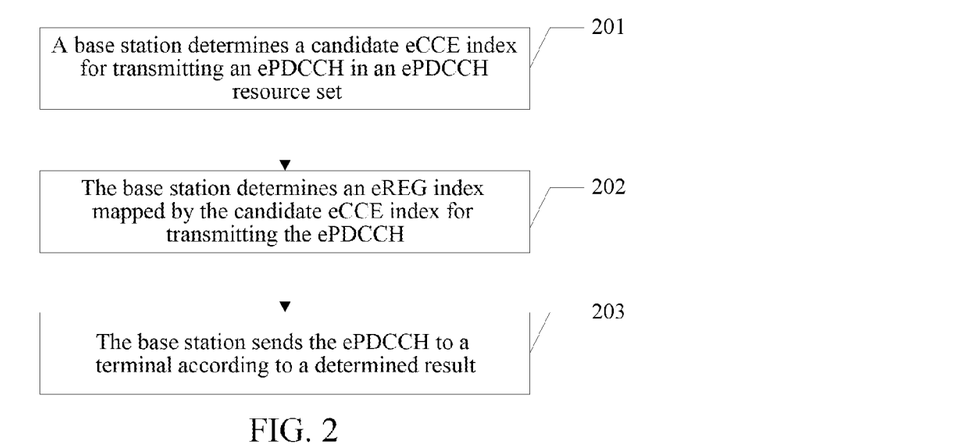
FIG. 2 is a schematic diagram of an embodiment of an enhanced physical downlink control channel (ePDCCH) transmitting method according to the embodiment of the present document.

As shown in FIG. 2, in the embodiment 1 of the enhanced physical downlink control channel (ePDCCH) transmitting method of the present document, a base station executes the following steps:

In step 201, a candidate enhanced control channel element (eCCE) index for transmitting an ePDCCH in an ePDCCH resource set is determined.

The ePDCCH mapping method can be mainly divided into two kinds: continuous mapping and discrete mapping, the base station will configure K resource block pair sets (hereinafter referred to as resource sets) for transmitting the ePDCCH, one resource block pair set includes N resource block pairs, wherein, K is 1 or 2, a value of N is 2, 4 and 8, one resource block pair includes 16 enhanced Resource Element Groups (eREGs) numbered from 0 to 15, one resource block pair corresponds to 2 enhanced Control Channel Elements (eCCEs) or 4 eCCEs, when one resource block pair corresponds to 2 eCCEs, an eREG corresponding to the eCCEs is {0, 2, 4, 6, 8, 10, 12, 14} or {1, 3, 5, 7, 9, 11, 13, 15}, eCCEs corresponding to the continuously mapped ePDCCH (called L-eCCE for short) are constituted of eREGs of one resource block pair, and eCCEs corresponding to the discretely mapped ePDCCH (called D-eCCE for short) are constituted of eREGs of multiple resource block pairs. In addition, search space of the enhanced physical downlink control channel of the UE includes a UE-specific search space.

The method for determining the eCCE index is not limited in the embodiments of the present document, and specifically, the eCCE index can be determined with a method similar to the method for determining the CCE index in the related art.

Alternatively, with regard to an aggregation level L, the eCCE index for transmitting the ePDCCH in the ePDCCH resource set is determined through the following method:

with regard to $M^{(L)}$ candidate locations of the ePDCCH of the aggregation level L, eCCEs of two adjacent candidate locations are located in different eCCE groups in the resource set, a method for determining the eCCE groups is sequentially dividing all eCCEs in the ePDCCH resource set into n groups, and each group includes 2 or 4 eCCEs.

Alternatively, a sequence of the eCCEs of the two adjacent candidate locations selecting the eCCE groups is one of the following, and a cyclical selection can be made:

when N=8, the n is 8, the sequence of selecting the eCCE groups is {0, 5, 2, 7, 4, 1, 6, 3}, or {0, 4, 2, 6, 1, 5, 3, 7}, or {0, 3, 6, 1, 4, 7, 2, 5}, or {0, 1, 2, 3, 4, 5, 6, 7};

when N=4, the n is 4, the sequence of selecting the eCCE groups is {0, 1, 2, 3}, or {0, 2, 1, 3}, or {0, 3, 2, 1};

when N=2, the n is 2, the sequence of selecting the eCCE groups is {0, 1}, or {1, 0};

Different scheduling gains and blocking rates can be obtained in different eCCE group selection sequences.

Alternatively, with regard to an aggregation level L, the eCCE index for transmitting the ePDCCH in the ePDCCH resource set is determined through the following method:

$$L\{(Y+m')\bmod \lfloor N_{eCCE}/L \rfloor\}+i,$$

wherein, $N_{eCCE}$ is the number of eCCEs included in the resource set, Y is an initial candidate location index for transmitting the ePDCCH in the ePDCCH resource set, $m'=m \times T_L \times k$, $T_L$ is $\lfloor M/L \rfloor$, M is the number of eCCEs included in one resource block, k is 1, 3 and 5; i represents an index of an eCCE corresponding to an ePDCCH whose aggregation level is L, i=0, . . . , L−1, $M^{(L)}$ is the number of candidate locations corresponding to the ePDCCH of the aggregation level L in the correspondingly configured resource set, m represents a candidate location index corresponding to the ePDCCH, and m=0, . . . , $M^{(L)}$−1;

or, $$L\left\{\left(\left(m \times k+\left\lfloor\frac{Y}{T_L}\right\rfloor\right) \times T_L+\left(Y+m+\left\lfloor\frac{m}{N}\right\rfloor\right)\bmod T_L\right)\bmod \lfloor N_{eCCE}/L \rfloor\right\}+i,$$

wherein, N is the number of resource blocks included in the resource set, $N_{eCCE}$ is the number of eCCEs included in the resource set, Y is an initial candidate location index for transmitting the ePDCCH in the ePDCCH resource set, $T_L$ is $\lfloor M/L \rfloor$, M is the number of eCCEs included in one resource block, k is 1, 3 and 5; i represents an index of an eCCE corresponding to an ePDCCH whose aggregation level is L, i=0, . . . , L−1, $M^{(L)}$ is the number of candidate locations corresponding to the ePDCCH of the aggregation level L in the correspondingly configured resource set, m represents a candidate location index corresponding to the ePDCCH, and m=0, . . . , $M^{(L)}$−1.

In the step 201, in the above alternative manner, the candidate locations of the continuously mapped ePDCCH can be mapped to multiple resource block pairs; and a continuous ePDCCH and a discrete ePDCCH can be multiplexed in the same resource block pair, a blocking rate in the multiplexing is reduced at the same time, and it makes mappings in various scenarios (a value of N and a value of K are different) tend to be identical. Wherein, k represents the number of sets used for transmitting the ePDCCH, and N represents the number of resource block pairs in one set used for transmitting the ePDCCH.

In step 202, an enhanced resource element group (eREG) index mapped by the candidate eCCE index for transmitting the ePDCCH is determined.

With regard to the method for mapping the L-eCCE, it also may be determined with reference to the method for the L-CCE in the related art. The D-eCCE will be emphatically described below.

The eCCE mentioned in the embodiments of the present document can be a discretely mapped eCCE (D-eCCE).

A mapping relationship between the eCCE index and the eREG index is represented as: the ePDCCH resource set including k D-eCCE groups divided according to a sequence of D-eCCE indexes, in the same D-eCCE group, each D-eCCE being mapped to the same eREG index group, each eREG index group including a plurality of eREG indexes, and when different D-eCCEs of the same D-eCCE group are mapped to the same eREG index, the same eREG index corresponding to the different D-eCCEs being located on different resource blocks.

The mapping relationship between the eCCE index and the eREG index enables the continuous ePDCCH and the discrete ePDCCH to be multiplexed in the same resource block pair, and a blocking rate in the multiplexing is reduced.

In the implementation, the above mapping relationship can be achieved through a table or a formula, and with regard to the formula, no limitation is made in the embodiments of the present document.

In step 203, the ePDCCH is sent to a terminal according to a determined result.

Sequences of steps 202 and 201 can be exchanged, mapping from each eCCE to the eREG in the resource set is firstly defined, and then the eCCE index corresponding to the terminal is determined.

Embodiment 2

What is different from the embodiment 1 is to determine the eREG index according to the following formula:

PRBIndex=mod(eREGIndex,$N$);

eREGIndexInPRB=mod(floor(eCCEIndex/$N$)+mod(eCCEIndex,$N$)*$M$+eREGIndex*$M$,$k$);

moreover, mod represents remainder, floor represents rounded down, the same as below.

Wherein, the eCCEIndex is a D-eCCE index, the eREGIndex is an eREG index corresponding to the D-eCCE, N is the number of corresponding resource blocks in one ePDCCH resource set, M is the number of corresponding eCCEs in one resource block, and K is the number of eREGs included in one resource block.

It should be noted that, the method in the embodiment also makes the mapping relationship between the eCCE index and the eREG index be represented as: the ePDCCH resource set including k D-eCCE groups divided according to a sequence of D-eCCE indexes, in the same D-eCCE group, each D-eCCE being mapped to the same eREG index group, each eREG index group including a plurality of eREG indexes, and when different D-eCCEs of the same D-eCCE group are mapped to the same eREG index, the same eREG index corresponding to the different D-eCCEs being located on different resource blocks.

By determining the eREG index with the above formula, it enables the continuous ePDCCH and the discrete ePDCCH to be multiplexed in the same resource block pair, and a blocking rate in the multiplexing is reduced.

Application examples will be given to make descriptions below.

APPLICATION EXAMPLE 1

It is assumed that k=16, N=2, M=2, and eREGs in one resource block are numbered from 0 to 15, a corresponding relationship between D-eCCEs and each eREG in the resource set is as shown in the following table:

|         | PRB#0 | PRB#1 |
|---------|-------|-------|
| D-eCCE#0 | 0     | 2     |
|         | 4     | 6     |
|         | 8     | 10    |
|         | 12    | 14    |
| D-eCCE#1 | 2     | 4     |
|         | 6     | 8     |
|         | 10    | 12    |
|         | 14    | 0     |
| D-eCCE#2 | 1     | 3     |
|         | 5     | 7     |
|         | 9     | 11    |
|         | 13    | 15    |
| D-eCCE#3 | 3     | 5     |
|         | 7     | 9     |
|         | 11    | 13    |
|         | 15    | 1     |

APPLICATION EXAMPLE 2

It is assumed that k=16, N=2, M=4, and eREGs in one resource block are numbered from 0 to 15, a corresponding relationship between D-eCCEs and each eREG in the resource set is as shown in the following table:

|         | PRB#0 | PRB#1 |
|---------|-------|-------|
| D-eCCE#0 | 0     | 4     |
|         | 8     | 12    |
| D-eCCE#1 | 4     | 8     |
|         | 12    | 0     |
| D-eCCE#2 | 1     | 5     |
|         | 9     | 13    |
| D-eCCE#3 | 5     | 9     |
|         | 13    | 1     |
| D-eCCE#4 | 2     | 6     |
|         | 10    | 14    |
| D-eCCE#5 | 6     | 10    |
|         | 14    | 2     |
| D-eCCE#6 | 3     | 7     |
|         | 11    | 15    |
| D-eCCE#7 | 7     | 11    |
|         | 15    | 3     |

APPLICATION EXAMPLE 3

It is assumed that k=16, N=4, M=2, and eREGs in one resource block are numbered from 0 to 15, a corresponding relationship between D-eCCEs and each eREG in the resource set is as shown in the following table:

|         | PRB#0 | PRB#1 | PRB#2 | PRB#3 |
|---------|-------|-------|-------|-------|
| D-eCCE#0 | 0     | 2     | 4     | 6     |
|         | 8     | 10    | 12    | 14    |
| D-eCCE#1 | 2     | 4     | 6     | 8     |
|         | 10    | 12    | 14    | 0     |
| D-eCCE#2 | 4     | 6     | 8     | 10    |
|         | 12    | 14    | 0     | 2     |
| D-eCCE#3 | 6     | 8     | 10    | 12    |
|         | 14    | 0     | 2     | 4     |

-continued

|  | PRB#0 | PRB#1 | PRB#2 | PRB#3 |
|---|---|---|---|---|
| D-eCCE#4 | 1 | 3 | 5 | 7 |
|  | 9 | 11 | 13 | 15 |
| D-eCCE#5 | 3 | 5 | 7 | 9 |
|  | 11 | 13 | 15 | 1 |
| D-eCCE#6 | 5 | 7 | 9 | 11 |
|  | 13 | 15 | 1 | 3 |
| D-eCCE#7 | 7 | 9 | 11 | 13 |
|  | 15 | 1 | 3 | 5 |

APPLICATION EXAMPLE 4

It is assumed that k=16, N=4, M=4, and eREGs in one resource block are numbered from 0 to 15, a corresponding relationship between D-eCCEs and each eREG in the resource set is as shown in the following table:

|  | PRB#0 | PRB#1 | PRB#2 | PRB#3 |
|---|---|---|---|---|
| D-eCCE#0 | 0 | 4 | 8 | 12 |
| D-eCCE#1 | 4 | 8 | 12 | 0 |
| D-eCCE#2 | 8 | 12 | 0 | 4 |
| D-eCCE#3 | 12 | 0 | 4 | 8 |
| D-eCCE#4 | 1 | 5 | 9 | 13 |
| D-eCCE#5 | 5 | 9 | 13 | 1 |
| D-eCCE#6 | 9 | 13 | 1 | 5 |
| D-eCCE#7 | 13 | 1 | 5 | 9 |
| D-eCCE#8 | 2 | 6 | 10 | 14 |
| D-eCCE#9 | 6 | 10 | 14 | 2 |
| D-eCCE#10 | 10 | 14 | 2 | 6 |
| D-eCCE#11 | 14 | 2 | 6 | 10 |
| D-eCCE#12 | 3 | 7 | 11 | 15 |
| D-eCCE#13 | 7 | 11 | 15 | 3 |
| D-eCCE#14 | 11 | 15 | 3 | 7 |
| D-eCCE#15 | 15 | 3 | 7 | 11 |

APPLICATION EXAMPLE 5

It is assumed that k=16, N=8, M=2, and eREGs in one resource block are numbered from 0 to 15, a corresponding relationship between D-eCCEs and each eREG in the resource set is as shown in the following table:

|  | PRB#0 | PRB#1 | PRB#2 | PRB#3 | PRB#4 | PRB#5 | PRB#6 | PRB#7 |
|---|---|---|---|---|---|---|---|---|
| D-eCCE#0 | 0 | 2 | 4 | 6 | 8 | 10 | 12 | 14 |
| D-eCCE#1 | 2 | 4 | 6 | 8 | 10 | 12 | 14 | 0 |
| D-eCCE#2 | 4 | 6 | 8 | 10 | 12 | 14 | 0 | 2 |
| D-eCCE#3 | 6 | 8 | 10 | 12 | 14 | 0 | 2 | 4 |
| D-eCCE#4 | 8 | 10 | 12 | 14 | 0 | 2 | 4 | 6 |
| D-eCCE#5 | 10 | 12 | 14 | 0 | 2 | 4 | 6 | 8 |
| D-eCCE#6 | 12 | 14 | 0 | 2 | 4 | 6 | 8 | 10 |
| D-eCCE#7 | 14 | 0 | 2 | 4 | 6 | 8 | 10 | 12 |
| D-eCCE#8 | 1 | 3 | 5 | 7 | 9 | 11 | 13 | 15 |
| D-eCCE#9 | 3 | 5 | 7 | 9 | 11 | 13 | 15 | 1 |
| D-eCCE#10 | 5 | 7 | 9 | 11 | 13 | 15 | 1 | 3 |
| D-eCCE#11 | 7 | 9 | 11 | 13 | 15 | 1 | 3 | 5 |
| D-eCCE#12 | 9 | 11 | 13 | 15 | 1 | 3 | 5 | 7 |
| D-eCCE#13 | 11 | 13 | 15 | 1 | 3 | 5 | 7 | 9 |
| D-eCCE#14 | 13 | 15 | 1 | 3 | 5 | 7 | 9 | 11 |
| D-eCCE#15 | 15 | 1 | 3 | 5 | 7 | 9 | 11 | 13 |

The first groups of formulas of the embodiment 2 and embodiment 3 may have a unified description approach, with reference to the following formulas:

$$PRBIndex = \mathrm{mod}(eREGIndex, N) + \mathrm{floor}((N*M-1)/16)*M*\mathrm{mod}(eCCEIndex, (N/M));$$

$$X = N/\mathrm{ceil}((N*M)/16);$$

$$ReCCEIndex = (\mathrm{floor}(eCCEIndex/2) + \mathrm{mod}(eCCEIndex, 2)*8)*\mathrm{floor}((N*M-1)/16) + eCCEIndex*\mathrm{ceil}((32-N*M), 32);$$

$$eREGIndexInPRB = \mathrm{mod}(\mathrm{floor}(ReCCEIndex/X) + \mathrm{mod}(ReCCEIndex, N)*M + eREGIndex*M, 16).$$

Embodiment 3

The difference between the embodiment 3 and the embodiment 1 is that: the eCCE is a discretely mapped eCCE (D-eCCE), when the number of corresponding resource blocks in one ePDCCH resource set is 8, the number of corresponding eCCEs in one resource block is 4, and one eCCE corresponds to 4 eREGs, the mapping relationship between the eCCE index and the eREG index is represented as: one resource set including 16 D-eCCE groups, the D-eCCE groups being obtained by dividing every 2 D-eCCEs into one group according to the sequence of D-eCCE indexes, wherein, each group of D-eCCEs is mapped to 8 eREGs of 8 resource blocks.

An eREG corresponding to the eCCE group is one of the following:

{0, 2, 4, 6, 8, 10, 12, 14};

{1, 3, 5, 7, 9, 11, 13, 15};

{0, 4, 8, 12};

{1, 5, 9, 13};

{2, 6, 10, 14};

{3, 7, 11, 15}.

Alternatively, the above mapping relationship can be achieved with any group in the following three groups of formulas:

the first group of formulas:

PRBIndex=eREGIndex+4*mod(eCCEIndex,2);

or,

PRBIndex=mod(eCCEIndex,8);

ReCCEIndex=floor(eCCEIndex/2)+mod(eCCEIndex,2)*8;

eREGIndexInPRB=mod(floor(ReCCEIndex/4)+ReCCEIndex*$M$+eREGIndex*$M$,16);

the second group of formulas:

PRBIndex=eREGIndex+4*mod(eCCEIndex,2);

or,

PRBIndex=mod(eCCEIndex,8);

ReCCEIndex=floor(eCCEIndex/2);

eREGIndexInPRB=mod(floor(ReCCEIndex/4)+ReCCEIndex*$M$+eREGIndex*$M$,16);

the third group of formulas:

PRBIndex=eREGIndex+4*floor(eCCEIndex/16);

or,

PRBIndex=mod(eCCEIndex,8);

eREGIndexInPRB=mod(floor(eCCEIndex/4)+eCCEIndex*$M$+eREGIndex*$M$,16);

in the above three groups of formulas, the eCCEIndex is a D-eCCE index, the eREGIndex is an eREG index corresponding to the D-eCCE, N is the number of corresponding resource blocks in one ePDCCH resource set, M is the number of corresponding eCCEs in one resource block, and 16 is the number of eREGs included in one resource block.

With any one group of formulas above, it enables the continuous ePDCCH and the discrete ePDCCH to be multiplexed in the same resource block pair, and a blocking rate in the multiplexing is reduced.

In addition, it also enables to adopt a unified mapping method in various scenarios (various values of N and various values of k); wherein, k represents the number of sets used for transmitting the ePDCCH, and N represents the number of resource block pairs in one set used for transmitting the ePDCCH.

Application examples will be given to make detailed descriptions below.

It is assumed that k=16, N=8, M=4, and eREGs in one resource block are numbered from 0 to 15, if the first group of formulas is adopted, PRBIndex=eREGIndex+4*mod(eCCEIndex,2), a corresponding relationship between D-eCCEs and each eREG in the resource set is as shown in the following table:

TABLE 8

|  | PRB#0 | PRB#1 | PRB#2 | PRB#3 | PRB#4 | PRB#5 | PRB#6 | PRB#7 |
|---|---|---|---|---|---|---|---|---|
| D-eCCE#0 | 0 | 4 | 8 | 12 | | | | |
| D-eCCE#1 | | | | | 2 | 6 | 10 | 14 |
| D-eCCE#2 | 4 | 8 | 12 | 0 | | | | |
| D-eCCE#3 | | | | | 6 | 10 | 14 | 2 |
| D-eCCE#4 | 8 | 12 | 0 | 4 | | | | |
| D-eCCE#5 | | | | | 10 | 14 | 2 | 6 |
| D-eCCE#6 | 12 | 0 | 4 | 8 | | | | |
| D-eCCE#7 | | | | | 14 | 2 | 6 | 10 |
| D-eCCE#8 | 1 | 5 | 9 | 13 | | | | |
| D-eCCE#9 | | | | | 3 | 7 | 11 | 15 |
| D-eCCE#10 | 5 | 9 | 13 | 1 | | | | |
| D-eCCE#11 | | | | | 7 | 11 | 15 | 3 |
| D-eCCE#12 | 9 | 13 | 1 | 5 | | | | |
| D-eCCE#13 | | | | | 11 | 15 | 3 | 7 |
| D-eCCE#14 | 13 | 1 | 5 | 9 | | | | |
| D-eCCE#15 | | | | | 15 | 3 | 7 | 11 |
| D-eCCE#16 | 2 | 6 | 10 | 14 | | | | |
| D-eCCE#17 | | | | | 4 | 8 | 12 | 0 |
| D-eCCE#18 | 6 | 10 | 14 | 2 | | | | |
| D-eCCE#19 | | | | | 8 | 12 | 0 | 4 |
| D-eCCE#20 | 10 | 14 | 2 | 6 | | | | |
| D-eCCE#21 | | | | | 12 | 0 | 4 | 8 |
| D-eCCE#22 | 14 | 2 | 6 | 10 | | | | |
| D-eCCE#23 | | | | | 0 | 4 | 8 | 12 |
| D-eCCE#24 | 3 | 7 | 11 | 15 | | | | |
| D-eCCE#25 | | | | | 5 | 9 | 13 | 1 |
| D-eCCE#26 | 7 | 11 | 15 | 3 | | | | |
| D-eCCE#27 | | | | | 9 | 13 | 1 | 5 |
| D-eCCE#28 | 11 | 15 | 3 | 7 | | | | |
| D-eCCE#29 | | | | | 13 | 1 | 5 | 9 |
| D-eCCE#30 | 15 | 3 | 7 | 11 | | | | |
| D-eCCE#31 | | | | | 1 | 5 | 9 | 13 | if the first group of formulas is adopted, PRBIndex=mod(eCCEIndex,8), a corresponding relationship between D-eCCEs and each eREG in the resource set is as shown in the following table:

TABLE 8

|  | PRB#0 | PRB#1 | PRB#2 | PRB#3 | PRB#4 | PRB#5 | PRB#6 | PRB#7 |
|---|---|---|---|---|---|---|---|---|
| D-eCCE#0 | 0 |  | 4 |  | 8 |  | 12 |  |
| D-eCCE#1 |  | 2 |  | 6 |  | 10 |  | 14 |
| D-eCCE#2 | 4 |  | 8 |  | 12 |  | 0 |  |
| D-eCCE#3 |  | 6 |  | 10 |  | 14 |  | 2 |
| D-eCCE#4 | 8 |  | 12 |  | 0 |  | 4 |  |
| D-eCCE#5 |  | 10 |  | 14 |  | 2 |  | 6 |
| D-eCCE#6 | 12 |  | 0 |  | 4 |  | 8 |  |
| D-eCCE#7 |  | 14 |  | 2 |  | 6 |  | 10 |
| D-eCCE#8 | 1 |  | 5 |  | 9 |  | 13 |  |
| D-eCCE#9 |  | 3 |  | 7 |  | 11 |  | 15 |
| D-eCCE#10 | 5 |  | 9 |  | 13 |  | 1 |  |
| D-eCCE#11 |  | 7 |  | 11 |  | 15 |  | 3 |
| D-eCCE#12 | 9 |  | 13 |  | 1 |  | 5 |  |
| D-eCCE#13 |  | 11 |  | 15 |  | 3 |  | 7 |
| D-eCCE#14 | 13 |  | 1 |  | 5 |  | 9 |  |
| D-eCCE#15 |  | 15 |  | 3 |  | 7 |  | 11 |
| D-eCCE#16 | 2 |  | 6 |  | 10 |  | 14 |  |
| D-eCCE#17 |  | 4 |  | 8 |  | 12 |  | 0 |
| D-eCCE#18 | 6 |  | 10 |  | 14 |  | 2 |  |
| D-eCCE#19 |  | 8 |  | 12 |  | 0 |  | 4 |
| D-eCCE#20 | 10 |  | 14 |  | 2 |  | 6 |  |
| D-eCCE#21 |  | 12 |  | 0 |  | 4 |  | 8 |
| D-eCCE#22 | 14 |  | 2 |  | 6 |  | 10 |  |
| D-eCCE#23 |  | 0 |  | 4 |  | 8 |  | 12 |
| D-eCCE#24 | 3 |  | 7 |  | 11 |  | 15 |  |
| D-eCCE#25 |  | 5 |  | 9 |  | 13 |  | 1 |
| D-eCCE#26 | 7 |  | 11 |  | 15 |  | 3 |  |
| D-eCCE#27 |  | 9 |  | 13 |  | 1 |  | 5 |
| D-eCCE#28 | 11 |  | 15 |  | 3 |  | 7 |  |
| D-eCCE#29 |  | 13 |  | 1 |  | 5 |  | 9 |
| D-eCCE#30 | 15 |  | 3 |  | 7 |  | 11 |  |
| D-eCCE#31 |  | 1 |  | 5 |  | 9 |  | 13 | if the second group of formulas is adopted, PRBIndex=eREGIndex+4*mod(eCCEIndex,2), a corresponding relationship between D-eCCEs and each eREG in the resource set is as shown in the following table:

|  | PRB#0 | PRB#1 | PRB#2 | PRB#3 | PRB#4 | PRB#5 | PRB#6 | PRB#7 |
|---|---|---|---|---|---|---|---|---|
| D-eCCE#0 | 0 | 4 | 8 | 12 |  |  |  |  |
| D-eCCE#1 | 4 | 8 | 12 | 0 |  |  |  |  |
| D-eCCE#2 | 8 | 12 | 0 | 4 |  |  |  |  |
| D-eCCE#3 | 12 | 0 | 4 | 8 |  |  |  |  |
| D-eCCE#4 | 1 | 5 | 9 | 13 |  |  |  |  |
| D-eCCE#5 | 5 | 9 | 13 | 1 |  |  |  |  |
| D-eCCE#6 | 9 | 13 | 1 | 5 |  |  |  |  |
| D-eCCE#7 | 13 | 1 | 5 | 9 |  |  |  |  |
| D-eCCE#8 | 2 | 6 | 10 | 14 |  |  |  |  |
| D-eCCE#9 | 6 | 10 | 14 | 2 |  |  |  |  |
| D-eCCE#10 | 10 | 14 | 2 | 6 |  |  |  |  |
| D-eCCE#11 | 14 | 2 | 6 | 10 |  |  |  |  |
| D-eCCE#12 | 3 | 7 | 11 | 15 |  |  |  |  |
| D-eCCE#13 | 7 | 11 | 15 | 3 |  |  |  |  |
| D-eCCE#14 | 11 | 15 | 3 | 7 |  |  |  |  |
| D-eCCE#15 | 15 | 3 | 7 | 11 |  |  |  |  |
| D-eCCE#16 |  |  |  |  | 4 | 8 | 12 | 0 |
| D-eCCE#17 |  |  |  |  | 8 | 12 | 0 | 4 |
| D-eCCE#18 |  |  |  |  | 12 | 0 | 4 | 8 |
| D-eCCE#19 |  |  |  |  | 0 | 4 | 8 | 12 |
| D-eCCE#20 |  |  |  |  | 5 | 9 | 13 | 1 |
| D-eCCE#21 |  |  |  |  | 9 | 13 | 1 | 5 |
| D-eCCE#22 |  |  |  |  | 13 | 1 | 5 | 9 |
| D-eCCE#23 |  |  |  |  | 1 | 5 | 9 | 13 |
| D-eCCE#24 |  |  |  |  | 6 | 10 | 14 | 2 |
| D-eCCE#25 |  |  |  |  | 10 | 14 | 2 | 6 |
| D-eCCE#26 |  |  |  |  | 14 | 2 | 6 | 10 |
| D-eCCE#27 |  |  |  |  | 2 | 6 | 10 | 14 |
| D-eCCE#28 |  |  |  |  | 7 | 11 | 15 | 3 |

-continued

|  | PRB#0 | PRB#1 | PRB#2 | PRB#3 | PRB#4 | PRB#5 | PRB#6 | PRB#7 |
|---|---|---|---|---|---|---|---|---|
| D-eCCE#29 |  |  |  |  | 11 | 15 | 3 | 7 |
| D-eCCE#30 |  |  |  |  | 15 | 3 | 7 | 11 |
| D-eCCE#31 |  |  |  |  | 3 | 7 | 11 | 15 |

The first groups of formulas of the embodiment 2 and the embodiment 3 can be unified as the following form:

PRBIndex=mod(eREGIndex,$N$)+floor(($N*M$−1)/16)
*$M*$ mod(eCCEIndex,($N/M$));

$X=N$/ceil(($N*M$)/16);

ReCCEIndex=(floor(eCCEIndex/2)+mod(eCCEIndex,2)*8)*floor(($N*h$−1)/16)+eCCEIndex*ceil((32−$N*M$),32);

eREGIndexInPRB=mod(floor(ReCCEIndex/$X$)+mod(ReCCEIndex,$N$)*$M$+eREGIndex*$M$,16).

Figure 3:
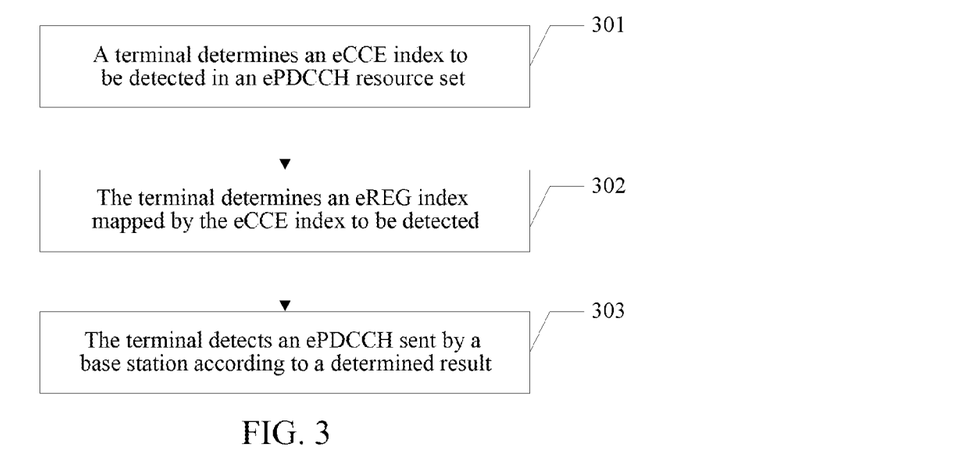
FIG. 3 is a schematic diagram of an embodiment of an enhanced physical downlink control channel (ePDCCH) receiving method according to the embodiment of the present document.

The embodiment of the present document also provides an enhanced physical downlink control channel (ePDCCH) receiving method, and as shown in FIG. 3, the following steps are included:

In step 301, a terminal determines an enhanced control channel element (eCCE) index to be detected in an ePDCCH resource set.

In step 302, the terminal determines an enhanced resource element group (eREG) index mapped by the eCCE index to be detected.

In step 303, the terminal detects an ePDCCH sent by a base station according to a determined result.

Understandably, the enhanced physical downlink control channel (ePDCCH) receiving method executed by the terminal is an inverse process of the enhanced physical downlink control channel (ePDCCH) transmitting method executed by the base station, correspondingly, the method for determining the control channel element eCCE index and the eREG index in all embodiments of the transmitting method is also applicable to the ePDCCH receiving method, which will not be repeated here.

Similarly, sequences of step 302 and step 301 can be exchanged.

Figure 4:
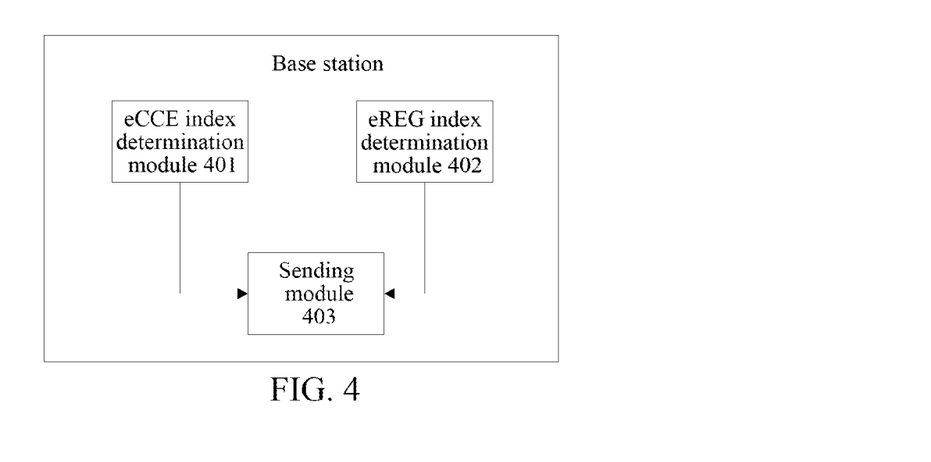
FIG. 4 is a schematic diagram of a module structure of a base station according to the embodiment of the present document.

In order to implement the above ePDCCH transmitting method, the embodiment of the present document also provides a base station, and as shown in FIG. 4, the base station includes:

an eCCE index determination module 401, used to determine a candidate enhanced control channel element (eCCE) index for transmitting an ePDCCH in an ePDCCH resource set;

an eREG index determination module 402, used to determine an enhanced resource element group (eREG) index mapped by the candidate eCCE index for transmitting the ePDCCH;

a sending module 403, used to detect the ePDCCH sent by the base station according to a determined result.

The eCCE is a discretely mapped eCCE (D-eCCE), and a mapping relationship between the eCCE index and the eREG index is represented as: the ePDCCH resource set including k D-eCCE groups divided according to a sequence of D-eCCE indexes, in the same D-eCCE group, each D-eCCE being mapped to the same eREG index group, each eREG index group including a plurality of eREG indexes, and when different D-eCCEs of the same D-eCCE group are mapped to the same eREG index, the same eREG index corresponding to the different D-eCCEs being located on different resource blocks.

Alternatively, the eCCE is a discretely mapped eCCE (D-eCCE), the eREG index determination module determines the eREG index according to the following formula:

PRBIndex=mod(eREGIndex,$N$);

eREGIndexInPRB=mod(floor(eCCEIndex/$N$)+mod(eCCEIndex,$N$)*$M$+eREGIndex*$M$,$k$);

wherein, the eCCEIndex is a D-eCCE index, the eREGIndex is an eREG index corresponding to the D-eCCE, N is the number of corresponding resource blocks in one ePDCCH resource set, M is the number of corresponding eCCEs in one resource block, and K is the number of eREGs included in one resource block.

The eCCE is a discretely mapped eCCE (D-eCCE), when the number of corresponding resource blocks in one ePDCCH resource set is 8, the number of corresponding eCCEs in one resource block is 4, and one eCCE corresponds to 4 eREGs, the mapping relationship between the eCCE index and the eREG index is represented as: one resource set including 16 D-eCCE groups, the D-eCCE groups being obtained by dividing every 2 D-eCCEs into one group according to the sequence of D-eCCE indexes, wherein, each group of D-eCCEs is mapped to 8 eREGs of 8 resource blocks.

Alternatively, the eCCE is a discretely mapped eCCE (D-eCCE), the eREG index determination module determines the eREG index according to the following formula:

PRBIndex=eREGIndex+4*mod(eCCEIndex,2);

or,

PRBIndex=mod(eCCEIndex,8);

ReCCEIndex=floor(eCCEIndex/2)+mod(eCCEIndex,2)*8;

eREGIndexInPRB=mod(floor(ReCCEIndex/4)+ReCCEIndex*$M$+eREGIndex*$M$,16);

or,

PRBIndex=eREGIndex+4*mod(eCCEIndex,2);

or,

PRBIndex=mod(eCCEIndex,8);

ReCCEIndex=floor(eCCEIndex/2);

eREGIndexInPRB=mod(floor(ReCCEIndex/4)+ReCCEIndex*$M$+eREGIndex*$M$,16);

or,

PRBIndex=eREGIndex+4*floor(eCCEIndex/16);

or,

PRBIndex=mod(eCCEIndex,8);

eREGIndexInPRB=mod(floor(eCCEIndex/4)+
  eCCEIndex*M+eREGIndex*M,16);

wherein, the eCCEIndex is a D-eCCE index, the eREGIndex is an eREG index corresponding to the D-eCCE, N is the number of corresponding resource blocks in one ePDCCH resource set, M is the number of corresponding eCCEs in one resource block, and 16 is the number of eREGs included in one resource block.

An eREG corresponding to the eCCE group is one of the following:
{0, 2, 4, 6, 8, 10, 12, 14};
{1, 3, 5, 7, 9, 11, 13, 15};
{0, 4, 8, 12};
{1, 5, 9, 13};
{2, 6, 10, 14};
{3, 7, 11, 15};

Alternatively, with regard to an aggregation level L, the eCCE index determination module determines the candidate eCCE index for transmitting the ePDCCH in the ePDCCH resource set with the following method:

with regard to $M^{(L)}$ candidate locations of the ePDCCH of the aggregation level L, eCCEs of two adjacent candidate locations are located in different eCCE groups in the resource set, a method for determining the eCCE groups is sequentially dividing all eCCEs in the ePDCCH resource set into n groups, and each group includes 2 or 4 eCCEs.

Alternatively, a sequence of the eCCEs of the two adjacent candidate locations selecting the eCCE groups is one of the following:

when N=8, the n is 8, the sequence of selecting the eCCE groups is {0, 5, 2, 7, 4, 1, 6, 3}, or {0, 4, 2, 6, 1, 5, 3, 7}, or {0, 3, 6, 1, 4, 7, 2, 5}, or {0, 1, 2, 3, 4, 5, 6, 7};

when N=4, the n is 4, the sequence of selecting the eCCE groups is {0, 1, 2, 3}, or {0, 2, 1, 3}, or {0, 3, 2, 1};

when N=2, the n is 2, the sequence of selecting the eCCE groups is {0, 1}, or {1, 0};

wherein, N is the number of corresponding resource blocks in one ePDCCH resource set.

Alternatively, the eCCE index determination module calculates the candidate eCCE index for transmitting the ePDCCH according to the following formula:

$$L\{(Y+m')\mathrm{mod}\lfloor N_{eCCE}/L\rfloor\}+i,$$

or, $$L\left\{\left(\left(m\times k+\left\lfloor\frac{Y}{T_L}\right\rfloor\right)\times T_L+\left(Y+m+\left\lfloor\frac{m}{N}\right\rfloor\right)\mathrm{mod}T_L\right)\mathrm{mod}\lfloor N_{eCCE}/L\rfloor\right\}+i,$$

wherein, L is the aggregation level, N is the number of resource blocks comprised in the resource set, $N_{eCCE}$ is the number of eCCEs comprised in the resource set, Y is an initial candidate location index for transmitting the ePDCCH in the ePDCCH resource set, m'=m×$T_L$×k, $T_L$ is |M/L|, M is the number of eCCEs comprised in one resource block, k is 1, 3 and 5; i represents an index of an eCCE corresponding to an ePDCCH whose aggregation level is L, i=0, ..., L-1, $M^{(L)}$ is a number of candidate locations corresponding to the ePDCCH of the aggregation level L in the correspondingly configured resource set, m represents a candidate location index corresponding to the ePDCCH, and m=0, ..., $M^{(L)}$-1.

Figure 5:
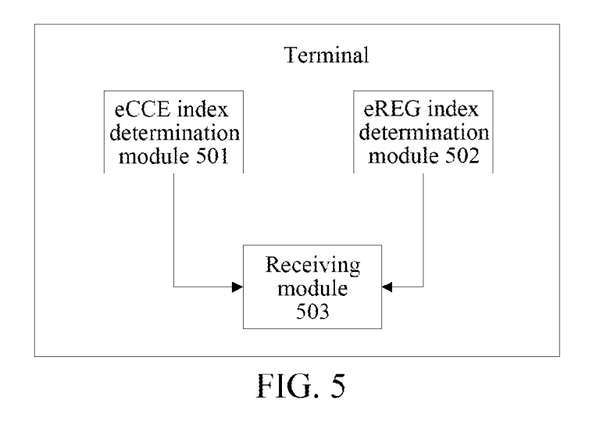
FIG. 5 is a schematic diagram of a module structure of a terminal according to the embodiment of the present document.

In order to implement the above ePDCCH receiving method, the embodiment of the present document also provides a terminal, and the terminal includes:

an eCCE index determination module 501, used to determine an enhanced control channel element (eCCE) index to be detected in an ePDCCH resource set;

an eREG index determination module 502, used to determine an enhanced resource element group (eREG) index mapped by the eCCE index to be detected;

a receiving module 503, used to detect and receive an ePDCCH sent by a base station according to a determined result.

The eCCE is a discretely mapped eCCE (D-eCCE), and a mapping relationship between the eCCE index and the eREG index is represented as: the ePDCCH resource set including k D-eCCE groups divided according to a sequence of D-eCCE indexes, in the same D-eCCE group, each D-eCCE being mapped to the same eREG index group, each eREG index group including a plurality of eREG indexes, and when different D-eCCEs of the same D-eCCE group are mapped to the same eREG index, the same eREG index corresponding to the different D-eCCEs being located on different resource blocks.

Alternatively, the eCCE is a discretely mapped eCCE (D-eCCE), the eREG index determination module determines the eREG index according to the following formula:

PRBIndex=mod(eREGIndex,N);

eREGIndexInPRB=mod(floor(eCCEIndex/N)+mod
  (eCCEIndex,N)*M+eREGIndex*M,k);

wherein, the eCCEIndex is a D-eCCE index, the eREGIndex is an eREG index corresponding to the D-eCCE, N is the number of corresponding resource blocks in one ePDCCH resource set, M is the number of corresponding eCCEs in one resource block, and K is the number of eREGs included in one resource block.

Alternatively, the eCCE is a discretely mapped eCCE (D-eCCE), when the number of corresponding resource blocks in one ePDCCH resource set is 8, the number of corresponding eCCEs in one resource block is 4, and one eCCE corresponds to 4 eREGs, the mapping relationship between the eCCE index and the eREG index is represented as: one resource set including 16 D-eCCE groups, the D-eCCE groups being obtained by dividing every 2 D-eCCEs into one group according to the sequence of D-eCCE indexes, wherein, each group of D-eCCEs is mapped to 8 eREGs of 8 resource blocks.

Alternatively, the eCCE is a discretely mapped eCCE (D-eCCE), the eREG index determination module determines the eREG index according to the following formula:

PRBIndex=eREGIndex+4*mod(eCCEIndex,2);

or,

PRBIndex=mod(eCCEIndex,8);

ReCCEIndex=floor(eCCEIndex/2)+mod(eCCEIndex,
  2)*8;

eREGIndexInPRB=mod(floor(ReCCEIndex/4)+
  ReCCEIndex*M+eREGIndex*M,16);

or,

PRBIndex=eREGIndex+4*mod(eCCEIndex,2);

or,

PRBIndex=mod(eCCEIndex,8);

ReCCEIndex=floor(eCCEIndex/2);

eREGIndexInPRB=mod(floor(ReCCEIndex/4)+
    ReCCEIndex*M+eREGIndex*M,16);

or,

PRBIndex=eREGIndex+4*floor(eCCEIndex/16);

or,

PRBIndex=mod(eCCEIndex,8);

eREGIndexInPRB=mod(floor(eCCEIndex/4)+
    eCCEIndex*M+eREGIndex*M,16);

wherein, the eCCEIndex is a D-eCCE index, the eREGIndex is an eREG index corresponding to the D-eCCE, N is the number of corresponding resource blocks in one ePDCCH resource set, M is the number of corresponding eCCEs in one resource block, and 16 is the number of eREGs included in one resource block.

An eREG corresponding to the eCCE group is one of the following:
{0, 2, 4, 6, 8, 10, 12, 14};
{1, 3, 5, 7, 9, 11, 13, 15};
{0, 4, 8, 12};
{1, 5, 9, 13};
{2, 6, 10, 14};
{3, 7, 11, 15}.

Alternatively, with regard to an aggregation level L, the eCCE index determination module determines the candidate eCCE index for transmitting the ePDCCH in the ePDCCH resource set with the following method:

with regard to $M^{(L)}$ candidate locations of the ePDCCH of the aggregation level L, eCCEs of two adjacent candidate locations are located in different eCCE groups in the resource set, a method for determining the eCCE groups is sequentially dividing all eCCEs in the ePDCCH resource set into n groups, and each group includes 2 or 4 eCCEs.

Alternatively, a sequence of the eCCEs of the two adjacent candidate locations selecting the eCCE groups is one of the following:

when N=8, the n is 8, the sequence of selecting the eCCE groups is {0, 5, 2, 7, 4, 1, 6, 3}, or {0, 4, 2, 6, 1, 5, 3, 7}, or {0, 3, 6, 1, 4, 7, 2, 5}, or {0, 1, 2, 3, 4, 5, 6, 7};

when N=4, the n is 4, the sequence of selecting the eCCE groups is {0, 1, 2, 3}, or {0, 2, 1, 3}, or {0, 3, 2, 1};

when N=2, the n is 2, the sequence of selecting the eCCE groups is {0, 1}, or {1, 0};

wherein, N is the number of corresponding resource blocks in one ePDCCH resource set.

Specifically, the candidate eCCE index for transmitting the ePDCCH is calculated according to the following formula:

$$L\{(Y+m')\mathrm{mod}\lfloor N_{eCCE}/L \rfloor\} + i,$$

or, $$L\left\{\left(\left(m \times k + \left\lfloor \frac{Y}{T_L} \right\rfloor\right) \times T_L + \left(Y + m + \left\lfloor \frac{m}{N} \right\rfloor\right) \mathrm{mod} T_L\right) \mathrm{mod} \lfloor N_{eCCE}/L \rfloor\right\} + i,$$

wherein, L is the aggregation level, N is the number of resource blocks comprised in the resource set, $N_{eCCE}$ is the number of eCCEs comprised in the resource set, Y is an initial candidate location index for detecting the ePDCCH in the ePDCCH resource set, m'=m×$T_L$×k, $T_L$ is |M/L|, M is the number of eCCEs comprised in one resource block, k is 1, 3 and 5; i represents an index of an eCCE corresponding to an ePDCCH whose aggregation level is L, i=0, ..., L−1, $M^{(L)}$ is a number of candidate locations corresponding to the ePDCCH of the aggregation level L in the correspondingly configured resource set, m represents a candidate location index corresponding to the ePDCCH, and m=0, ..., $M^{(L)}$−1.

Through the above embodiments, an ePDCCH transmitting and receiving method and device, base station and user equipment are provided, so that the discretely mapped ePDCCH is mapped to multiple resource blocks; and it tries to adopt a unified mapping method in various scenarios (a scenario of the resource block pair including 4 eCCEs, a scenario of the resource block pair including 2 eCCEs, various values of N and various values of k), thus a stable ePDCCH transmission performance is guaranteed, and a resource utilization rate and scheduling flexibility also can be improved. It should be noted that these technical effects are not possessed in all the above embodiments, certain technical effects can only be acquired through preferred embodiments.

Apparently, the skilled in the art should understand that the modules or steps of the present document mentioned above can be implemented through a universal calculating device, and they can be concentrated on a single calculating device or distributed in a network consisting of multiple calculating devices. Alternatively, the modules or steps can be implemented through program codes which can be executed by the calculating device, thus, they can be stored in a storage device to be executed by the calculating device, or they can be made into multiple integrated circuit modules respectively, or multiple modules or steps of them can be made into a single integrated circuit module to be implemented. Therefore, the present document is not limited to any combination of hardware and software in a specific form.

The above description is only the preferred embodiments of the present document, which is not used to limit the present document. The present document can have various modifications and changes for the skilled in the art. All the modifications, equivalent substitutions, and improvements, etc. made within the spirit and principle of the present document shall fall into the protection scope of the present document.

INDUSTRIAL APPLICABILITY

The embodiments of the present document provide an ePDCCH transmitting and receiving method and device, base station and user equipment, so that the discretely mapped ePDCCH is mapped to multiple resource blocks; and it tries to adopt a unified mapping method in various scenarios (a scenario of the resource block pair including 4 eCCEs, a scenario of the resource block pair including 2 eCCEs, various values of N and various values of k), thus a stable ePDCCH transmission performance is guaranteed, and a resource utilization rate and scheduling flexibility also can be improved.

What is claimed is:

1. An enhanced physical downlink control channel (ePDCCH) transmitting method, comprising:
    determining, by a base station, a candidate enhanced control channel element (eCCE) index for transmitting an ePDCCH in an ePDCCH resource set;
    determining, by the base station, an enhanced resource element group (eREG) index to which the candidate eCCE index for transmitting the ePDCCH is mapped;
    sending, by the base station, the ePDCCH to a terminal according to a determined result; and wherein, the eCCE is a discretely mapped eCCE (D-eCCE), and a mapping relationship between the eCCE index and the eREG index comprises:
the ePDCCH resource set comprising k D-eCCE groups divided according to a sequence of D-eCCE indexes, in a same D-eCCE group, each D-eCCE being mapped to a same eREG index group, each eREG index group comprising a plurality of eREG indexes, and when different D-eCCEs of the same D-eCCE group are mapped to a same eREG index, the same eREG index corresponding to the different D-eCCEs being located on different resource blocks;
wherein: the eCCE is a discretely mapped eCCE (D-eCCE), when a number of corresponding resource blocks in one ePDCCH resource set is 8, a number of corresponding eCCEs in one resource block is 4, and one eCCE corresponds to 4 eREGs, the mapping relationship between the eCCE index and the eREG index comprises: one resource set comprising 16 D-eCCE groups, the D-eCCE groups being obtained by dividing every 2 D-eCCEs into one group according to the sequence of D-eCCE indexes, wherein, each group of D-eCCEs is mapped to 8 eREGs of 8 resource blocks;
wherein: the eCCE is a discretely mapped eCCE (D-eCCE), the method for determining the eREG index comprises:

PRBIndex=mod(eREGIndex, N);

eREGIndexInPRB=mod(floor(eCCEIndex/N)+mod (eCCEIndex,N)*M+eREGIndex*M,k);

wherein, the eCCEIndex is a D-eCCE index, the eREGIndex is an eREG index corresponding to the D-eCCE, N is the number of corresponding resource blocks in one ePDCCH resource set, M is the number of corresponding eCCEs in one resource block, and K is the number of eREGs comprised in one resource block;

or,

PRBIndex=eREGIndex+4*mod(eCCEIndex,2);

or,

PRBIndex=mod(eCCEIndex,8);

ReCCEIndex=floor(eCCEIndex/2)+mod(eCCEIndex, 2)*8;

eREGIndexInPRB=mod(floor(ReCCEIndex/4)+ ReCCEIndex*M+eREGIndex*M,16);

or,

PRBIndex=eREGIndex+4*mod(eCCEIndex,2);

or,

PRBIndex=mod(eCCEIndex,8);

ReCCEIndex=floor(eCCEIndex/2);

eREGIndexInPRB=mod(floor(ReCCEIndex/4)+ ReCCEIndex*M+eREGIndex*M,16);

or,

PRBIndex=eREGIndex+4*floor(eCCEIndex/16);

or,

PRBIndex=mod(eCCEIndex,8);

eREGIndexInPRB=mod(floor(eCCEIndex/4)+ eCCEIndex*M+eREGIndex*M,16);

wherein, the eCCEIndex is a D-eCCE index, the eREGIndex is an eREG index corresponding to the D-eCCE, N is the number of corresponding resource blocks in one ePDCCH resource set, M is the number of corresponding eCCEs in one resource block, and 16 is the number of eREGs comprised in one resource block.

2. The method according to claim 1, wherein: an eREG corresponding to the eCCE group is one of the following:
{0, 2, 4, 6, 8, 10, 12, 14};
{1, 3, 5, 7, 9, 11, 13, 15};
{0, 4, 8, 12};
{1, 5, 9, 13};
{2, 6, 10, 14};
{3, 7, 11, 15}.

3. The method according to claim 1, wherein: with regard to an aggregation level L, the candidate eCCE index for transmitting the ePDCCH in the ePDCCH resource set comprises:
with regard to $M^{(L)}$ candidate locations of the ePDCCH of the aggregation level L, eCCEs of two adjacent candidate locations being located in different eCCE groups in the resource set, a method for determining the eCCE groups comprising sequentially dividing all eCCEs in the ePDCCH resource set into n groups, wherein each group comprises 2 or 4 eCCEs;
wherein: a sequence of the eCCEs of the two adjacent candidate locations selecting the eCCE groups is one of the following:
when N=8, the n is 8, the sequence of selecting the eCCE groups is {0, 5, 2, 7, 4, 1, 6, 3}, or {0, 4, 2, 6, 1, 5, 3, 7}, or {0, 3, 6, 1, 4, 7, 2, 5}, or {0, 1, 2, 3, 4, 5, 6, 7};
when N=4, the n is 4, the sequence of selecting the eCCE groups is {0, 1, 2, 3}, or {0, 2, 1, 3}, or {0, 3, 2, 1};
when N=2, the n is 2, the sequence of selecting the eCCE groups is {0, 1}, or {1, 0};
wherein, N is the number of corresponding resource blocks in one ePDCCH resource set.

4. The method according to claim 1, wherein: the candidate eCCE index is calculated according to the following formula:

$$L\{(Y+m')\bmod\lfloor N_{eCCE}/L\rfloor\}+i,$$

or, $$L\left\{\left(\left(m\times k+\left\lfloor\frac{Y}{T_L}\right\rfloor\right)\times T_L+\left(Y+m+\left\lfloor\frac{m}{N}\right\rfloor\right)\bmod T_L\right)\bmod\lfloor N_{eCCE}/L\rfloor\right\}+i,$$

wherein, L is the aggregation level, N is the number of resource blocks comprised in the resource set, $N_{eCCE}$ is the number of eCCEs comprised in the resource set, Y is an initial candidate location index for transmitting the ePDCCH in the ePDCCH resource set, $m'=m\times T_L\times k$, $T_L$ is $|M/L|$, M is the number of eCCEs comprised in one resource block, k is 1, 3 and 5; i represents an index of an eCCE corresponding to an ePDCCH whose aggregation level is L, i=0, . . . , L−1, $M^{(L)}$ is a number of candidate locations corresponding to the ePDCCH of the aggregation level L in the correspondingly configured resource set, m represents a candidate location index corresponding to the ePDCCH, and m=0, . . . , $M^{(L)}-1$.

5. The method according to claim 1, comprising:
determining, by a terminal, an enhanced control channel element (eCCE) index to be detected in an ePDCCH resource set;
determining, by the terminal, an enhanced resource element group (eREG) index to which the eCCE index to be detected is mapped;
detecting an ePDCCH sent by a base station according to a determined result.

6. A base station, comprising:
a processor, and
a non-transitory computer-readable storage medium storing programs that when executed by the processor cause the processor to:
determine a candidate enhanced control channel element (eCCE) index for transmitting an enhanced physical downlink control channel (ePDCCH) in an ePDCCH resource set;
determine an enhanced resource element group (eREG) index to which the candidate eCCE index for transmitting the ePDCCH is mapped; and
detect the ePDCCH sent by the base station according to a determined result;
wherein, the eCCE is a discretely mapped eCCE (D-eCCE), and a mapping relationship between the eCCE index and the eREG index comprises:
the ePDCCH resource set comprising k D-eCCE groups divided according to a sequence of D-eCCE indexes, in a same D-eCCE group, each D-eCCE being mapped to a same eREG index group, each eREG index group comprising a plurality of eREG indexes, and when different D-eCCEs of the same D-eCCE group are mapped to a same eREG index, the same eREG index corresponding to the different D-eCCEs being located on different resource blocks;
wherein: the eCCE is a discretely mapped eCCE (D-eCCE), when a number of corresponding resource blocks in one ePDCCH resource set is 8, a number of corresponding eCCEs in one resource block is 4, and one eCCE corresponds to 4 eREGs, the mapping relationship between the eCCE index and the eREG index comprises: one resource set comprising 16 D-eCCE groups, the D-eCCE groups being obtained by dividing every 2 D-eCCEs into one group according to the sequence of D-eCCE indexes, wherein, each group of D-eCCEs is mapped to 8 eREGs of 8 resource blocks;
wherein: the eCCE is a discretely mapped eCCE (D-eCCE), the eREG index determination module determines the eREG index by means of:

PRBIndex=mod(eREGIndex, N);

eREGIndexInPRB=mod(floor(eCCEIndex/N)+mod (eREGIndex,N)*M+eREGIndex* M,k);

wherein, the eCCEIndex is a D-eCCE index, the eREGIndex is an eREG index corresponding to the D-eCCE, N is the number of corresponding resource blocks in one ePDCCH resource set, M is the number of corresponding eCCEs in one resource block, and K is the number of eREGs comprised in one resource block;

or,

PRBIndex=eREGIndex+4*mod(eCCEIndex,2);

or,

PRBIndex=mod(eCCEIndex,8);

ReCCEIndex=floor(eCCEIndex/2)+mod(eCCEIndex, 2)*8;

eREGIndexInPRB=mod(floor(ReCCEIndex/4)+ ReCCEIndex*M+eREGIndex*M,16;

or,

PRBIndex=eREGIndex+4*mod(eCCEIndex,2);

or,

PRBIndex=mod(eCCEIndex,8);

ReCCEindex=floor(eCCEIndex/2);

eREGIndexInPRB=mod(floor(ReCCEIndex/4)+ ReCCEIndex*M+eREGIndex*M,16);

or,

PRBIndex=eREGIndex+4*floor(eCCEIndex/16);

or,

PRBIndex=mod(eCCEINdex,8);

eREGIndexInPRB=mod(floor(eCCEIndex/4)+ eCCEIndex*M+eREGIndex*M, 16);

wherein, the eCCEIndex is a D-eCCE index, the eREGIndex is an eREG index corresponding to the D-eCCE, N is the number corresponding resource blocks in one ePDCCH resource set, M is the number of corresponding eCCEs in one resource block, and 16 is the number of eREGs comprises in one resource block.

7. The base station according to claim 6, wherein: an eREG corresponding to the eCCE group is one of the following:
{0, 2, 4, 6, 8, 10, 12, 14};
{1, 3, 5, 7, 9, 11, 13, 15};
{0, 4, 8, 12};
{1, 5, 9, 13};
{2, 6, 10, 14};
{3, 7, 11, 15}.

8. The base station according to claim 6, wherein: with regard to an aggregation level L, the eCCE index determination module determines the candidate eCCE index for transmitting the ePDCCH in the ePDCCH resource set with the following method:
with regard to $M^{(L)}$ candidate locations of the ePDCCH of the aggregation level L, eCCEs of two adjacent candidate locations being located in different eCCE groups in the resource set, a method for determining the eCCE groups comprising sequentially dividing all eCCEs in the ePDCCH resource set into n groups, wherein each group comprises 2 or 4 eCCEs.

9. The base station according to claim 8, wherein: a sequence of the eCCEs of the two adjacent candidate locations selecting the eCCE groups is one of the following:
when N=8, the n is 8, the sequence of selecting the eCCE groups is {0, 5, 2, 7, 4, 1, 6, 3}, or {0, 4, 2, 6, 1, 5, 3, 7}, or {0, 3, 6, 1, 4, 7, 2, 5}, or {0, 1, 2, 3, 4, 5, 6, 7};

when N=4, the n is 4, the sequence of selecting the eCCE groups is {0, 1, 2, 3}, or {0, 2, 1, 3}, or {0, 3, 2, 1};
when N=2, the n is 2, the sequence of selecting the eCCE groups is {0, 1}, or {1, 0};
wherein, N is the number of corresponding resource blocks in one ePDCCH resource set.

10. The base station according to claim 6, wherein: the eCCE index determination module calculates the candidate eCCE index for transmitting the ePDCCH according to the following formula:

$$L\{(Y+m') \bmod \lfloor N_{eCCE}/L \rfloor\}+i,$$

or, $$L\left\{\left(\left(m \times k+\left\lfloor \frac{Y}{T_L}\right\rfloor\right) \times T_L+\left(Y+m+\left\lfloor \frac{m}{N}\right\rfloor\right) \bmod T_L\right) \bmod \lfloor N_{eCCE}/L \rfloor\right\}+i,$$

wherein, L is the aggregation level, N is the number of resource blocks comprised in the resource set, $N_{eCCE}$ is the number of eCCEs comprised in the resource set, Y is an initial candidate location index for transmitting the ePDCCH in the ePDCCH resource set, m'=m×$T_L$×k, $T_L$ is |M/L|, M is the number of eCCEs comprised in one resource block, k is 1, 3 and 5; i represents an index of an eCCE corresponding to an ePDCCH whose aggregation level is L, i=0, . . . , L−1, $M^{(L)}$ is a number of candidate locations corresponding to the ePDCCH of the aggregation level L in the correspondingly configured resource set, m represents a candidate location index corresponding to the ePDCCH, and m=0, . . . , $M^{(L)}$−1.

11. A terminal, comprising:
a processor, and
a non-transitory computer-readable storage medium storing programs that when executed by the processor cause the processor to:
determine an enhanced control channel element (eCCE) index to be detected in an enhanced physical downlink control channel (ePDCCH) resource set;
determine an enhanced resource element group (eREG) index to which the eCCE index to be detected is mapped;
detect and receive an ePDCCH sent by a base station according to a determined result;
wherein, the eCCE is a discretely mapped eCCE (D-eCCE), and a mapping relationship between the eCCE index and the eREG index comprises: the ePDCCH resource set comprising k D-eCCE groups divided according to a sequence of D-eCCE indexes, in a same D-eCCE group, each D-eCCE being mapped to a same eREG index group, each eREG index group comprising a plurality of eREG indexes, and when different D-eCCEs of the same D-eCCE group are mapped to a same eREG index, the same eREG index corresponding to the different D-eCCEs being located on different resource blocks;
wherein: the eCCE is a discretely mapped eCCE (D-eCCE), when a number of corresponding resource blocks in one ePDCCH resource set is 8, a number of corresponding eCCEs in one resource block is 4, and one eCCE corresponds to 4 eREGs, the mapping relationship between the eCCE index and the eREG index comprises: one resource set comprising 16 D-eCCE groups, the D-eCCE groups being obtained by dividing every 2 D-eCCEs into one group according to the sequence of D-eCCE indexes, wherein, each group of D-eCCEs is mapped to 8 eREGs of 8 resource blocks;
wherein: the eCCE is a discretely mapped eCCE (D-eCCE), the eREG index determination module determines the eREG index by means of:

PRBIndex=mod(eREGIndex,N);

eREGIndexPRB=mod(floor(eCCEIndex/N)+mod(eCCEIndex,N)*M+eREGIndex*M,k);

wherein, the eCCEIndex is a D-eCCE index, the eREGIndex is an eREG index corresponding to the D-eCCE, N is the number of corresponding resource blocks in one ePDCCH resource set, M is the number of corresponding eCCEs in one resource block, and K is the number of eREGs comprised in one resource block;

or,

PRBIndex=eREGIndex+4*mod(eCCEIndex,2);

or,

PRBIndex=mod(eCCEIndex,8);

ReCCEIndex=floor(eCCEIndex/2)+mod(eCCEIndex,2)*8;

eREGIndexInPRB=mod(floor(ReCCEIndex/4)+ReCCEIndex*M+eREGIndex*M,16);

or,

PRBIndex=eREGIndex+4*mod(eCCEIndex,2);

or,

PRBIndex=mod(eCCEIndex,8);

ReCCEIndex=floor(eCCEIndex/2);

eREGIndexInPRB=mod(floor(ReCCEIndex/4)+ReCCEIndex*M+eREGIndex*M,16);

or,

PRBIndex=eREGIndex+4*floor(eCCEIndex/16);

or,

PRBIndex=mod(eCCEIndex,8);

eREGIndexInPRB=mod(floor(eCCEIndex/4)+eCCEIdex*M+eREGIndex*M,16);

wherein, the eCCEIndex is a D-eCCE index, the eREGIndex is an eREG index corresponding to the D-eCCE, N is the number of correspsonding resource blocks in on ePDCCH resource set, M is the number of corresponding eCCEs in one resource block, and 16 is the number of eREGs comprised in one resource book.

12. The terminal according to claim 11, wherein: an eREG corresponding to the eCCE group is one of the following:
{0, 2, 4, 6, 8, 10, 12, 14};
{1, 3, 5, 7, 9, 11, 13, 15};
{0, 4, 8, 12};
{1, 5, 9, 13};
{2, 6, 10, 14};
{3, 7, 11, 15}.

13. The terminal according to claim 11, wherein: with regard to an aggregation level L, the eCCE index determination module determines the candidate eCCE index for transmitting the ePDCCH in the ePDCCH resource set with the following method:

with regard to $M^{(L)}$ candidate locations of the ePDCCH of the aggregation level L, eCCEs of two adjacent candidate locations being located in different eCCE groups in the resource set, a method for determining the eCCE groups comprising sequentially dividing all eCCEs in the ePDCCH resource set into n groups, wherein each group comprises 2 or 4 eCCEs.

14. The terminal according to claim 13, wherein: a sequence of the eCCEs of the two adjacent candidate locations selecting the eCCE groups is one of the following:

when N=8, the n is 8, the sequence of selecting the eCCE groups is {0, 5, 2, 7, 4, 1, 6, 3}, or {0, 4, 2, 6, 1, 5, 3, 7}, or {0, 3, 6, 1, 4, 7, 2, 5}, or {0, 1, 2, 3, 4, 5, 6, 7};

when N=4, the n is 4, the sequence of selecting the eCCE groups is {0, 1, 2, 3}, or {0, 2, 1, 3}, or {0, 3, 2, 1};

when N=2, the n is 2, the sequence of selecting the eCCE groups is {0, 1}, or {1, 0};

wherein, N is the number of corresponding resource blocks in one ePDCCH resource set.

15. The terminal according to claim 11, wherein: the candidate eCCE index for transmitting the ePDCCH is calculated according to the following formula:

$$L\{(Y+m') \bmod \lfloor N_{eCCE}/L \rfloor\} + i,$$

or, $$L\left\{\left(\left(m \times k + \left\lfloor \frac{Y}{T_L} \right\rfloor\right) \times T_L + \left(Y + m + \left\lfloor \frac{m}{N} \right\rfloor\right) \bmod T_L\right) \bmod \lfloor N_{eCCE}/L \rfloor\right\} + i,$$

wherein, L is the aggregation level, N is the number of resource blocks comprised in the resource set, $N_{eCCE}$ is the number of eCCEs comprised in the resource set, Y is an initial candidate location index for detecting the ePDCCH in the ePDCCH resource set, m'=m×$T_L$×k $T_L$ is |M/L|, M is the number of eCCEs comprised in one resource block, k is 1, 3 and 5; i represents an index of an eCCE corresponding to an ePDCCH whose aggregation level is L, i=0, . . . , L−1, $M^{(L)}$ is a number of candidate locations corresponding to the ePDCCH of the aggregation level L in the correspondingly configured resource set, m represents a candidate location index corresponding to the ePDCCH, and m=0, . . . , $M^{(L)}$−1.

* * * * *